(12) United States Patent
Liu et al.

(10) Patent No.: US 9,964,941 B2
(45) Date of Patent: May 8, 2018

(54) METHOD, DEVICE AND SYSTEM FOR IMPROVING SYSTEM ACCURACY OF X-Y MOTION PLATFORM

(71) Applicant: Aleader Vision Technology Co., Ltd., Guangdong (CN)

(72) Inventors: Tao Liu, Guangdong (CN); Zhenbin Jiang, Guangdong (CN); Hengchang Wen, Guangdong (CN); Wenkai Xu, Guangdong (CN)

(73) Assignee: ALEADER VISION TECHNOLOGY CO., LTD., Guangdong (CN)

( * ) Notice: Subject to any disclaimer, the term of this patent is extended or adjusted under 35 U.S.C. 154(b) by 290 days.

(21) Appl. No.: 14/907,980

(22) PCT Filed: May 6, 2015

(86) PCT No.: PCT/CN2015/078349
§ 371 (c)(1),
(2) Date: Jan. 27, 2016

(87) PCT Pub. No.: WO2016/176833
PCT Pub. Date: Nov. 10, 2016

(65) Prior Publication Data
US 2017/0139394 A1 May 18, 2017

(51) Int. Cl.
*G05B 13/02* (2006.01)
*G05B 13/04* (2006.01)
(Continued)

(52) U.S. Cl.
CPC ......... *G05B 19/402* (2013.01); *G05B 19/404* (2013.01); *G05B 2219/37506* (2013.01);
(Continued)

(58) Field of Classification Search
CPC ........ G05B 2219/41176; G05B 19/402; G05B 2219/37506
(Continued)

(56) References Cited

U.S. PATENT DOCUMENTS

| 8,872,911 | B1 | 10/2014 | Wallack et al. |
| 2008/0195343 | A1 | 8/2008 | Osterlund et al. |
| 2014/0018957 | A1* | 1/2014 | Matsumoto ............ B25J 9/1697 700/251 |

FOREIGN PATENT DOCUMENTS

| CN | 101169595 A | 4/2008 |
| CN | 101216681 A | 7/2008 |
(Continued)

OTHER PUBLICATIONS

International Search Report, dated Jan. 15, 2016, issued in corresponding PCT/CN2015/078349.
(Continued)

*Primary Examiner* — Michael J Brown
(74) *Attorney, Agent, or Firm* — Kathleen D. Rigaut; Dann, Dorfman, Herrell and Skillman, P.C.

(57) ABSTRACT

Disclosed are a method, a device and a system for improving system accuracy of an X-Y motion platform, and the method includes: taking a picture of a preset calibration board synchronously as a controlled equipment on an X-Y motion platform moves, and analyzing the picture to obtain pixel coordinates of a calibration point in the picture, where the preset calibration board is taken as a reference; acquiring actual coordinates of the calibration point on the calibration board, and calculating actual position coordinates of the controlled equipment on the X-Y motion platform from the actual coordinates and the pixel coordinates of the calibration point; and adjusting a motion control system of the X-Y motion platform according to the actual position coordinates, to control the motion of the X-Y motion platform to
(Continued)

perform motion compensation for the controlled equipment. With the technical solution of the invention, the system accuracy can be improved, and the requirements for assembly and device selection can be reduced.

11 Claims, 4 Drawing Sheets

(51) Int. Cl.
*G05B 19/402* (2006.01)
*G05B 19/404* (2006.01)

(52) U.S. Cl.
CPC .............. *G05B 2219/37558* (2013.01); *G05B 2219/49368* (2013.01)

(58) Field of Classification Search
USPC .................................................. 700/32, 251
See application file for complete search history.

(56) References Cited

FOREIGN PATENT DOCUMENTS

| | | | |
|---|---|---|---|
| CN | 101221375 | A | 7/2008 |
| CN | 104199257 | A | 12/2014 |
| EP | 1172183 | A2 | 1/2002 |
| EP | 1437933 | A2 | 7/2004 |

OTHER PUBLICATIONS

Extended European Search Report, dated Sep. 6, 2016, issued in corresponding European Application No. 16152063.0.

\* cited by examiner

| Travel | category C0 | category C1 | category C2 | category C3 | category C4 |
|---|---|---|---|---|---|
| Below 100mm | 3 | 3.5 | 3 | 5 | 18 |
| 100mm - 200mm | 3.5 | 4.5 | 7 | 10 | 20 |
| 200mm - 315mm | 4 | 6 | 8 | 12 | 23 |
| 315mm - 400mm | 5 | 7 | 9 | 13 | 25 |
| 400mm - 500mm | 6 | 8 | 10 | 15 | 27 |
| 500mm - 630mm | 6 | 9 | 11 | 16 | 30 |
| 630mm - 800mm | 7 | 10 | 13 | 18 | 35 |
| 800mm - 1000mm | 8 | 11 | 15 | 21 | 40 |
| 1000mm - 1250mm | 9 | 13 | 18 | 24 | 46 |
| 1250mm - 1600mm | 11 | 15 | 21 | 29 | 54 |

Fig. 1

| System Accuracy Levels | | | | |
|---|---|---|---|---|
| | Level-000 Planeness | Level-00 Planeness | Level-0 Planeness | Level-1 Planeness |
| Specification (mm) | Planeness Tolerance (um) | Planeness Tolerance (um) | Planeness Tolerance (um) | Planeness Tolerance (um) |
| 300×300×70 | 1.5 | 3 | 5.5 | 11 |
| 300×400×70 | 1.5 | 3 | 6 | 12 |
| 400×400×70 | 2 | 3.5 | 6.5 | 13 |
| 400×500×100 | 2 | 3.5 | 7 | 14 |
| 400×600×100 | 2 | 3.5 | 7 | 14 |
| 400×630×100 | 2 | 3.5 | 7 | 14 |
| 450×600×100 | 2 | 3.5 | 7 | 14 |
| 500×600×100 | 2 | 3.5 | 7 | 14 |
| 500×800×100 | 2 | 4 | 8 | 16 |
| 600×900×100 | 2.5 | 4.5 | 9 | 18 |
| 600×900×130 | 2.5 | 4.5 | 9 | 18 |
| 1000×630×150 | 2.5 | 4.5 | 9 | 18 |
| 1000×750×150 | 2.5 | 4.5 | 9 | 18 |
| 1000×1000×150 | 2.5 | 5 | 10 | 20 |
| 1000×1500×200 | 2.9 | 5.7 | 11.3 | 22.6 |
| 1000×1600×200 | 3 | 6 | 12 | 24 |
| 1000×2000×200 | 3.5 | 6.5 | 13 | 26 |
| 1500×2000×200 | 3.5 | 7 | 14 | 28 |
| 1500×2000×300 | 3.5 | 7 | 14 | 28 |
| 1500×3000×300 | 3.5 | 7 | 14 | 28 |
| 2000×3000×300 | 4.5 | 8 | 18 | 36 |
| 2000×4000×400 | 5.5 | 11 | 22 | 40 |

METHOD, DEVICE AND SYSTEM FOR IMPROVING SYSTEM ACCURACY OF X-Y MOTION PLATFORM

TECHNICAL FIELD

The present invention relates to the field of X-Y motion platform control technologies, and in particular to a method, a device and a system for improving system accuracy of an X-Y motion platform.

TECHNICAL BACKGROUND

An X-Y motion platform system is a fundamental part of many digital control processing apparatuses and electronic processing apparatuses such as a worktable for laser processing apparatus, a surface attaching apparatus and a two-dimension (2D) measuring apparatus. A motion control system of the existing X-Y motion platform is mainly constituted by a computer, a motion controller, a step motor and related software. A conventional X-Y motion platform includes two (motor-driven) linear motion units, each of which generally includes a screw rod and a guide rail, and the combined motion of these two linear motion units generates a planar motion with two degrees of freedom (i.e. directions of X and Y axes) of the worktable.

Figure 1:
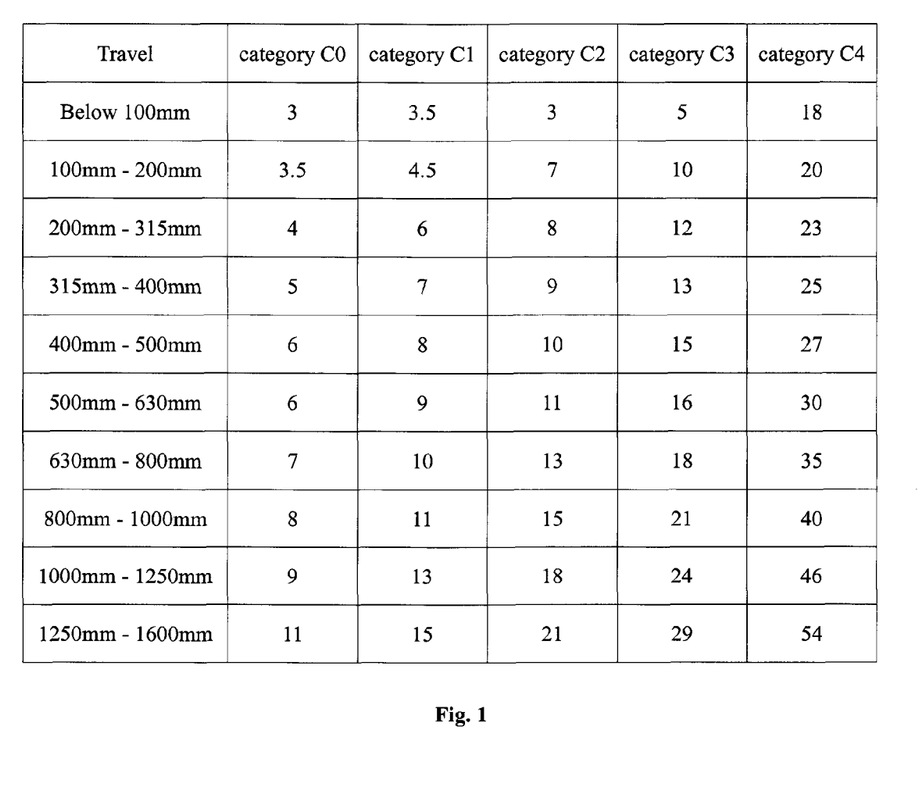
FIG. 1 is a reference table listing travels of screw rods and errors in a conventional X-Y motion platform.

However, an error tends to occur during the control on the motion of the worktable. For example, in the case that the worktable is desired to move to an ideal position with coordinates (302 mm, 216 mm), if the worktable is actually moved to a position with coordinates (301.98 mm, 216.07 mm), an error of (0.02 mm, 0.03 mm), which is also called as absolute movement error, is caused. The reason for causing the absolute movement error of the existing X-Y motion platform includes:

1) electric motor factors, i.e. an error caused by the electric motor per se, and an accumulative error is caused if the step motor stalls;

2) screw rod factors, i.e. an error in the motion screw rod per se, which depends on the category of the screw rod, for example, as shown in FIG. 1 showing lead errors (in a unit of μm) at various travels of the screw rod, an error of 6 μm is caused for a travel of 500 mm of the screw rod in the category CO with the highest system accuracy;

3) return-to-zero error, that is, an error might occur each time the motion platform returns to the origin, and hence the motion of the motion platform cannot always start at the same position each time;

4) assembly error, that is, an unavoidable error occurs to the assembly of the X-Y motion platform; and 5) other errors such as temperature and humidity errors.

As such, the system accuracy of the existing conventional X-Y motion platform is 10 μm to 50 μm.

Figure 2:
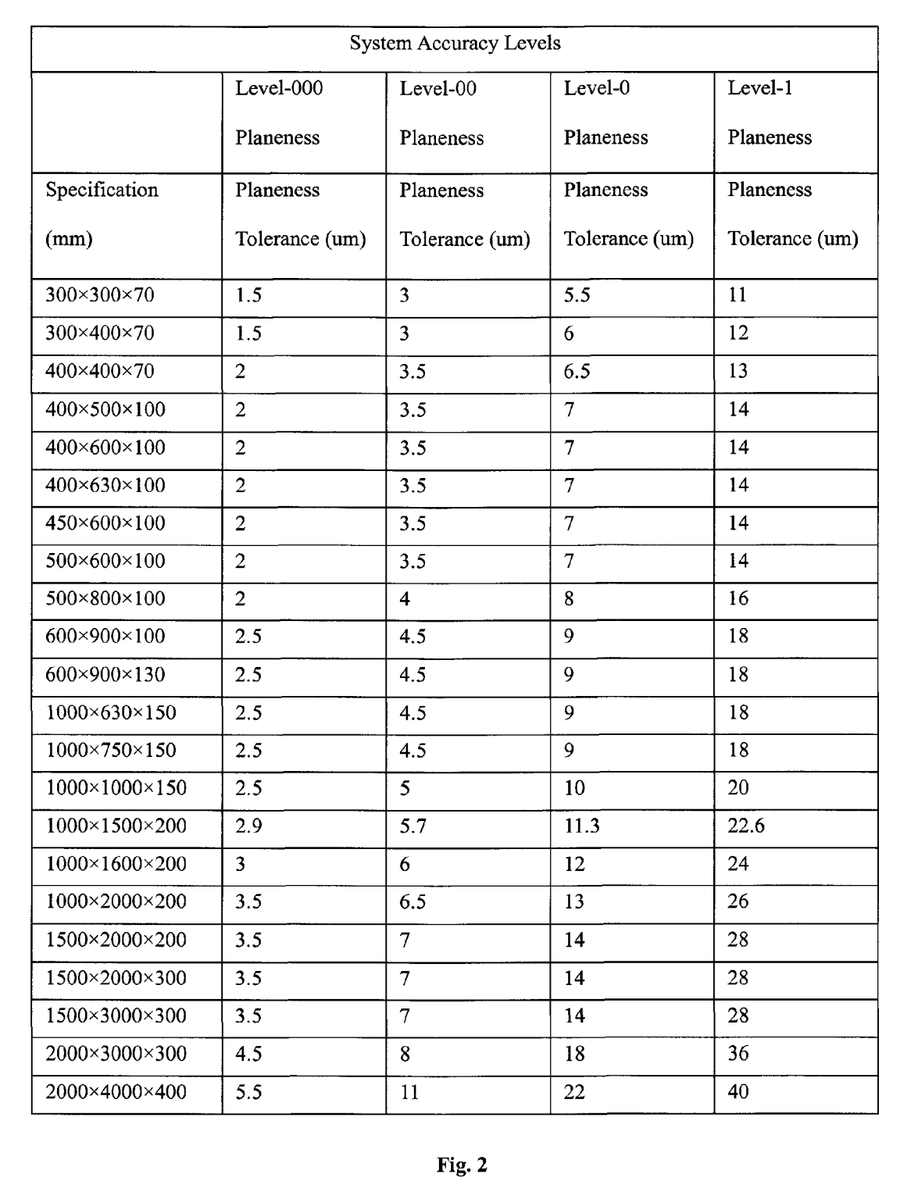
FIG. 2 is a reference table listing marble specifications and errors in a grating ruler X-Y motion platform based on marble platform.

In order to improve the system accuracy of an X-Y motion platform, an X-Y motion platform based on linear motor and a grating ruler X-Y motion platform based on marble platform have been proposed. The X-Y motion platform based on linear motor employs a better linear motor and a high-accuracy screw rod, and has system accuracy of ±10 μm considering by all the error factors. Likewise, the grating ruler X-Y motion platform based on marble platform employs a better linear motor and a high-accuracy screw rod, and has some essential parts made of marble which is of the grade shown in FIG. 2, however, due to the jitter interference of the grating ruler, the accumulative error cannot be eliminated in the background of large noise, the design requirements for hardware are strict, and the overall system accuracy is ±5 μm.

To improve the system accuracy of the X-Y motion platform in the prior art, stricter requirements are laid on the assembly and selection of devices, the system accuracy is limited, and further improvements are required.

SUMMARY OF THE INVENTION

It is an object of the present invention to put forward a method, a device and a system for improving the system accuracy of an X-Y motion platform, thereby improving the system accuracy and reducing the requirements for assembly and device selection.

To this end, the invention employs the following technical solutions.

A method for improving system accuracy of an X-Y motion platform includes:

taking a picture of a preset calibration board synchronously as a controlled equipment on an X-Y motion platform moves, and analyzing the picture to obtain pixel coordinates of a calibration point in the picture, wherein the preset calibration board is taken as a reference;

acquiring actual coordinates of the calibration point on the calibration board, and calculating actual position coordinates of the controlled equipment on the X-Y motion platform from the actual coordinates and the pixel coordinates of the calibration point; and adjusting a motion control system of the X-Y motion platform according to the actual position coordinates, to control the motion of the X-Y motion platform to perform motion compensation for the controlled equipment.

Before taking a picture of a preset calibration board synchronously as a controlled equipment on an X-Y motion platform moves, and analyzing the picture to obtain pixel coordinates of a calibration point in the picture, where the preset calibration board is taken as a reference, the method further includes:

presetting an auxiliary coordinate system for the X-Y motion platform, wherein the auxiliary coordinate system comprises a calibration board and an industrial lens, the calibration board is fixed in position relative to the controlled equipment on the X-Y motion platform, the coordinates of the calibration point on the calibration board are known, and the industrial lens is movable synchronously with the controlled equipment on the X-Y motion platform.

Taking a picture of a preset calibration board synchronously as a controlled equipment on an X-Y motion platform moves and analyzing the picture to obtain pixel coordinates of a calibration point in the picture includes:

taking the picture of the calibration board by the industrial lens, and calculating to obtain pixel coordinates of 4 calibration points in the picture around a center point of the picture.

Acquiring actual coordinates of the calibration point on the calibration board and calculating actual position coordinates of the controlled equipment on the X-Y motion platform from the actual coordinates and the pixel coordinates of the calibration point includes:

acquiring actual coordinates of the 4 calibration points on the calibration board, and calculating the actual position coordinates of the controlled equipment on the X-Y motion platform from the actual coordinates and the pixel coordinates of the 4 calibration points.

Calculating actual position coordinates of the controlled equipment from the actual coordinates and the pixel coordinates of the calibration point includes:

calculating first actual position coordinates ($X_{mm11}$, $Y_{mm11}$) of the controlled equipment by formulae:

$$\frac{X_{mm11} - X_{mm1}}{X_{mm2} - X_{mm1}} = \frac{X_{mm11} - X1}{X2 - X1};$$

$$\frac{Y_{mm11} - Y_{mm1}}{Y_{mm2} - Y_{mm1}} = \frac{Y_{mm11} - Y1}{Y2 - Y1};$$

calculating second actual position coordinates ($X_{mm22}$, $Y_{mm22}$) of the controlled equipment by formulae:

$$\frac{X_{mm22} - X_{mm3}}{X_{mm4} - X_{mm3}} = \frac{X_{mm22} - X3}{X4 - X3}; \text{ and}$$

$$\frac{Y_{mm22} - Y_{mm3}}{Y_{mm4} - Y_{mm3}} = \frac{Y_{mm22} - Y3}{Y4 - Y3};$$

calculating the actual position coordinates of the controlled equipment according to the first actual position coordinates and the second actual position coordinates, wherein (X1, Y1), (X2, Y2), (X3, Y3) and (X4, Y4) represent the pixel coordinates of the 4 calibration points, respectively, and (Xmm1, Ymm1), (Xmm2, Ymm2), (Xmm3, Ymm3) and (Xmm4, Ymm4) represent the actual coordinates of the 4 calibration points, respectively.

Calculating the actual position coordinates of the controlled equipment according to the first actual position coordinates and the second actual position coordinates includes:

obtaining the actual position coordinates (Xmm, Ymm) of the controlled equipment by formulae:

$$X_{mm}=0.5\times(X_{mm11}+X_{mm22});$$

$$Y_{mm}=0.5\times(Y_{mm11}+Y_{mm22}).$$

adjusting a motion control system of the X-Y motion platform according to the actual position coordinates to control the motion of the X-Y motion platform to perform motion compensation for the controlled equipment includes:

attaining preset target position coordinates of the controlled equipment;

obtaining a position offset of the controlled equipment according to the actual position coordinates and the target position coordinates, and feeding back the position offset to the motion control system of the X-Y motion platform; and the motion control system of the X-Y motion platform adjusting control parameters according to the position offset, to control the movement of the X-Y motion platform so as to perform motion compensation for the controlled equipment.

Obtaining the position offset of the controlled equipment according to the actual position coordinates and the target position coordinates includes:

obtaining the position offset (Dx, Dy) of the controlled equipment by formulae:

$$D_X=X_{mm}-X_{mm0};$$

$$D_Y=Y_{mm}-Y_{mm0};$$

wherein (Xmm0, Ymm0) represents the target position coordinates;

wherein the controlling the movement of the X-Y motion platform so as to perform motion compensation for the controlled equipment includes:

controlling the controlled equipment to move in a direction X by a distance Dx and to move in a direction Y by a distance Dy, so as to perform the motion compensation for the controlled equipment.

In another aspect of the invention, a device for improving the system accuracy of an X-Y motion platform is proposed and includes: a calibration board, an industrial lens and an auxiliary calibrating module, wherein the industrial lens is movable synchronously with a controlled equipment on the X-Y motion platform, the calibration board is fixed in position relative to the controlled equipment, the coordinates of the calibration point on the calibration board are known, the calibration board and the industrial lens are in communication with the auxiliary calibrating module, and the auxiliary calibrating module is in communication with the motion control system of the X-Y motion platform;

the industrial lens is configured to take a picture of the calibration board synchronously as the controlled equipment on the X-Y motion platform moves; and the auxiliary calibrating module is adapted to: analyze the picture to obtain pixel coordinates of the calibration point in the picture; calculate actual position coordinates of the controlled equipment from the actual coordinates and the pixel coordinates of the calibration point; and adjust a motion control system of the X-Y motion platform according to the actual position coordinates, to control the X-Y motion platform to move correspondingly so as to perform motion compensation for the controlled equipment.

The calibration board is disposed above, below, on the left of, on the right of, in front of or in back of the controlled equipment.

The industrial lens is disposed on the X-Y motion platform and is oriented to the calibration board.

In another aspect of the invention, a high-accuracy X-Y motion platform system is proposed and includes: an X-Y motion platform; a motion control system configured to control the motion of the X-Y motion platform in directions X and Y; and an auxiliary calibrating device in communication with the motion control system;

a controlled equipment is disposed on the X-Y motion platform;

the auxiliary calibrating device comprises: a calibration board, an industrial lens and an auxiliary calibrating module; wherein the industrial lens is movable synchronously with the controlled equipment, the calibration board is fixed in position relative to the controlled equipment, coordinates of each calibration point on the calibration board are known, and the calibration board and the industrial lens are in communication with the auxiliary calibrating module;

the industrial lens is configured to take a picture of the calibration board synchronously as a controlled equipment on the X-Y motion platform moves; and the auxiliary calibrating module is configured to: analyze the picture to obtain pixel coordinates of the calibration point in the picture; calculate actual position coordinates of the controlled equipment from the actual coordinates and the pixel coordinates of the calibration point; and adjust the motion control system according to the actual position coordinates, to control the motion of the X-Y motion platform so as to perform motion compensation for the controlled equipment.

The calibration board is disposed above, below, on the left of, on the right of, in front of or in back of the controlled equipment.

The industrial lens is disposed on the X-Y motion platform and is oriented to the calibration board.

The embodiments of the invention has the following beneficial effects:

In the embodiments of the invention, a picture of a preset calibration board is taken synchronously as a controlled equipment on an X-Y motion platform moves, and the picture is analyzed to obtain pixel coordinates of a calibration point in the picture, where the preset calibration board is taken as a reference; the actual coordinates of the calibration point on the calibration board are acquired, and the actual position coordinates of the controlled equipment on the X-Y motion platform are calculated from the actual coordinates and the pixel coordinates of the calibration point; and a motion control system of the X-Y motion platform is adjusted according to the actual position coordinates, to control the motion of the X-Y motion platform so as to perform motion compensation for the controlled equipment. With the solution of the invention, the actual position coordinates of the controlled equipment can be obtained and fed back as the feedback information for adjusting the motion control system of the X-Y motion platform so as to compensate for the movement of the controlled equipment, therefore, in comparison with other existing X-Y motion platforms, the control accuracy is improved, and the requirements for assembly and device selection are reduced.

DESCRIPTION OF DRAWINGS

In order to more clearly illustrate the technical solutions in the embodiments of the invention or in the prior art, the accompanying drawings for the description of the embodiments or the prior art are introduced briefly below. Apparently, the accompanying drawings introduced below merely illustrate some embodiments of the invention, and other drawings may be obtained from these accompanying drawings by those of ordinary skills in the art without creative work.

DETAILED DESCRIPTION OF THE PREFERRED EMBODIMENT

The technical solutions in the embodiments of the invention will be clearly and fully described below in conjunction with the accompanying drawings of the invention. Apparently, only a part of the embodiments of the invention, instead of all embodiments, are described herein. Other embodiments derived from the embodiments of the invention by those of ordinary skills in the art without creative work fall within the protection scope of the invention.

First Embodiment

Figure 3:
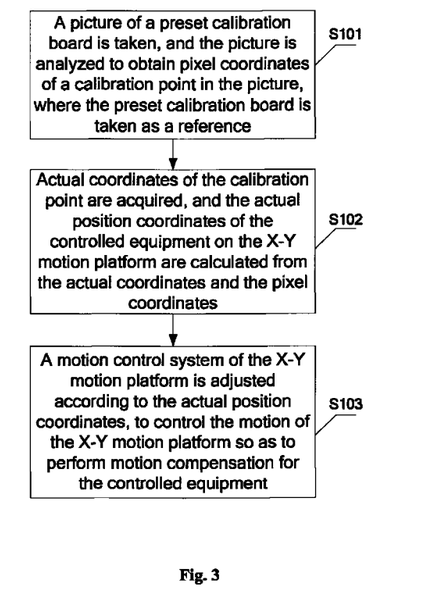
FIG. 3 is a schematic flow chart showing a method for improving the system accuracy of an X-Y motion platform according to a first embodiment of the invention.

A method for improving the system accuracy of an X-Y motion platform according to a first embodiment of the invention, which is illustrated below in conjunction with FIGS. 3 and 4, includes the following steps.

Step S101: a picture of a preset calibration board is taken synchronously as a controlled equipment on an X-Y motion platform moves, and the picture is analyzed to obtain pixel coordinates of a calibration point in the picture, where the preset calibration board is taken as a reference.

The calibration board in the first embodiment is a scale plate with coordinate information based on an X-Y plane, and the position of each calibration point on the scale plate is verified by a national-level measuring institution.

Figure 4:
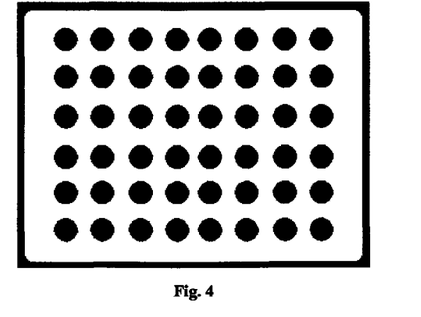
FIG. 4 is a schematic diagram of a calibration board employed in the first embodiment of the invention.

In this embodiment, an auxiliary coordinate system is configured in advance based on a conventional X-Y motion platform, and includes a calibration board and an industrial lens, where the calibration board is fixed in position relative to the controlled equipment on the X-Y motion platform, the coordinates of the calibration point on the calibration board are known (for example, referring to the structure of the calibration board shown in FIG. 4), and the industrial lens is movable synchronously with the controlled equipment on the X-Y motion platform. In this embodiment, the selection of the screw rod and the electric motor for the X-Y motion platform is not limited, and an ordinary screw rod, an ordinary electric motor and the existing assembly mode may be selected.

In this embodiment, the analyzing the picture to obtain the pixel coordinates of the calibration point in the picture may be implemented by any existing image processing technology, which is not limited in the invention. In this embodiment, the calibration board as shown in FIG. 4 is employed. The calibration board is planar, may be manufactured in a simpler way in comparison with 3D calibration objects, and is easy to guarantee the calibration accuracy, but two or more pictures are required for calibration.

Preferably, in this embodiment, the calibration board is disposed above the controlled equipment, and the industrial lens is fixed on a moving piece of the X-Y motion platform and is oriented to face the calibration board, so that camera-based calibration may be realized with reference to the calibration point on the calibration board. Alternatively, the calibration board may be disposed below the controlled equipment, or on the left of, on the right of, in front of or in back of the controlled equipment (that is, the calibration board may be disposed in any one of the six orientations, i.e., above, below, left, right, front and back, of the controlled equipment), and the industrial lens is fixed on a moving piece of the X-Y motion platform and is oriented to face the calibration board. Herein, the way of installing the calibration board and the lens is not limited in the invention.

Step S102: the actual coordinates of the calibration point on the calibration board are acquired, and the actual position coordinates of the controlled equipment on the X-Y motion platform are calculated from the actual coordinates and the pixel coordinates of the calibration point.

In the first embodiment, the coordinates of each calibration point on the calibration board are fixed, and may be acquired by the corresponding instrument.

Figure 5:
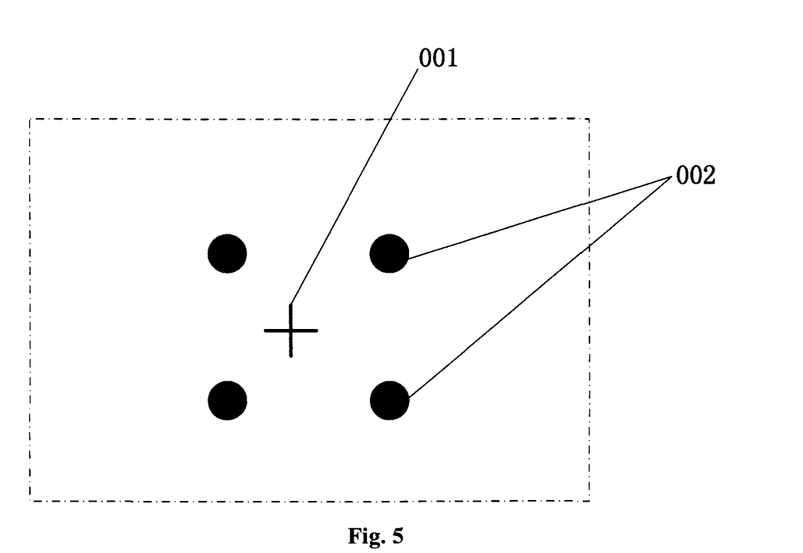
FIG. 5 is a schematic diagram of a picture taken according to the first embodiment of the invention.

As such, in the first embodiment, to determine whether the position coordinates of the controlled equipment match preset target position coordinates, a picture containing the calibration point on the calibration board is taken via the industrial lens, coordinates of the center point 001 of the picture is determined, then pixel coordinates (X1, Y1), (X2, Y2), (X3, Y3) and (X4, Y4) of 4 calibration points 002 around the center point 001 in the picture are calculated, the actual coordinates of the 4 calibration points 002 are respectively denoted by (Xmm1, Ymm1), (Xmm2, Ymm2), (Xmm3, Ymm3) and (Xmm4, Ymm4), and then the actual position coordinates (Xmm, Ymm) of the controlled equipment are calculated.

In order to ensure the accuracy of the obtained actual position coordinates of the controlled equipment, a set of actual position coordinates (Xmm11, Ymm11) are calculated from a group of parameters including the pixel coordinates (X1, Y1) and (X2, Y2) and the actual coordinates (Xmm1, Ymm1) and (Xmm2, Ymm2), and another set of actual position coordinates (Xmm22, Ymm22) are calculated from a group of parameters including the pixel coordinates (X3, Y3) and (X4, Y4) and the actual coordinates (Xmm3, Ymm3) and (Xmm4, Ymm4). For example, first actual position coordinates (Xmm11, Ymm11) of the controlled equipment are calculated by formulae:

$$\frac{X_{mm11} - X_{mm1}}{X_{mm2} - X_{mm1}} = \frac{X_{mm11} - X1}{X2 - X1};$$

$$\frac{Y_{mm11} - Y_{mm1}}{Y_{mm2} - Y_{mm1}} = \frac{Y_{mm11} - Y1}{Y2 - Y1};$$

second actual position coordinates (Xmm22, Ymm22) of the controlled equipment are calculated by a formulae:

$$\frac{X_{mm22} - X_{mm3}}{X_{mm4} - X_{mm3}} = \frac{X_{mm22} - X3}{X4 - X3};$$

$$\frac{Y_{mm22} - Y_{mm3}}{Y_{mm4} - Y_{mm3}} = \frac{Y_{mm22} - Y3}{Y4 - Y3};$$

then, in combination with the first and second actual position coordinates as obtained, the actual position coordinates (Xmm, Ymm) of the controlled equipment are obtain as:

$$X_{mm}=0.5\times(X_{mm11}+X_{mm22});$$

$$Y_{mm}=0.5\times(Y_{mm11}+Y_{mm22}).$$

It should be noted that, based on those 4 calibration points, the actual position coordinates of the controlled equipment may be alternatively calculated in other combination modes, for example, a set of actual position coordinates may be calculated from a group of parameters including the pixel coordinates (X1, Y1) and (X3, Y3) and the actual coordinates (Xmm1, Ymm1) and (Xmm3, Ymm3), and another set of actual position coordinates may be calculated from a group of parameters including the pixel coordinates (X2, Y2) and (X4, Y4) and the actual coordinates (Xmm2, Ymm2) and (Xmm4, Ymm4). Additionally, the way of calculating the actual position coordinates (Xmm, Ymm) of the controlled equipment in combination with the obtained two sets of actual position coordinates is not limited to the above way of averaging, and other ways of calculating may also be selected as actually desired.

Step S103: a motion control system of the X-Y motion platform is adjusted according to the actual position coordinates, to control the motion of the X-Y motion platform so as to perform motion compensation for the controlled equipment.

In this embodiment, the obtained actual position coordinates of the controlled equipment are fed back to the motion control system of the X-Y motion platform as the feedback information, the parameters of the motion control system are adjusted in conjunction with the target position coordinates initially assigned for the controlled equipment, and the X-Y motion platform is further moved under the control of the motion control system, so that motion compensation is performed for the controlled equipment. In a specific implementation, the preset target position coordinates (Xmm0, Ymm0) of the controlled equipment are obtained (from the configured parameters of the motion control system, for example), and then a position offset (Dx, Dy) of the controlled equipment is obtained according to the actual position coordinates (Xmm, Ymm) and the target position coordinates (Xmm0, Ymm0), where:

$$D_X = X_{mm} - X_{mm0};$$

$$D_Y = Y_{mm} - Y_{mm0};$$

Subsequently, the position offset is fed back to the motion control system of the X-Y motion platform, and the motion control system of the X-Y motion platform adjusts the control parameter according to the position offset, to control the X-Y motion platform to move in a direction X by a distance Dx and to move in a direction Y by a distance Dy. Therefore, it is guaranteed that the controlled equipment is moved to the preset target position coordinates, the movement error of the conventional X-Y motion platform is reduced, and the control accuracy is improved.

According to the first embodiment of the invention, the system accuracy of the conventional X-Y motion platform is improved by adding an auxiliary coordinate system to the conventional X-Y motion platform. Here, the actual position coordinates of the moving controlled equipment are obtained by the auxiliary coordinate system, and are taken as feedback information for adjusting the motion control system of the X-Y motion platform so as to compensate for the movement of the controlled equipment, thereby improving the control accuracy in comparison with other existing X-Y motion platforms, and also obtaining advantages below:

1) the requirements for assembly are reduced, especially in the case of a grating ruler X-Y motion platform based on a marble platform;
2) the requirements for the screw rod are reduced, and a screw rod with ordinary precision are suitable;
3) no return-to-zero error exists; and
4) an error of the electric motor per se will not affect the system accuracy.

Second Embodiment

A device for improving the system accuracy of an X-Y motion platform is proposed according to the second embodiment. The embodiment of the device shares the same concept as the above method embodiment, thus reference may be made to the above method embodiment for the detailed contents of the device embodiment that are not described herein.

The device according to the second embodiment of the invention will be illustrated below in conjunction with FIG. 5.

Figure 6:
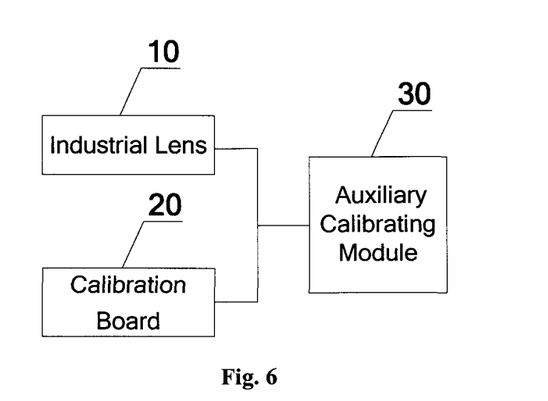
FIG. 6 is a schematic structural view of a device for improving the system accuracy of an X-Y motion platform according to a second embodiment of the invention.

In the second embodiment, a device for improving the system accuracy of an X-Y motion platform includes: a calibration board 10, an industrial lens 20 and an auxiliary calibrating module 30; where, the industrial lens 20 is configured to move synchronously with a controlled equipment on the X-Y motion platform, the calibration board 10 is fixed in position relative to the controlled equipment, coordinates of each calibration point on the calibration board 10 are known, the calibration board 10 and the industrial lens 20 are in communication with the auxiliary calibrating module 30, and the auxiliary calibrating module 30 is in communication with the motion control system of the X-Y motion platform.

The industrial lens 20 is configured to take a picture of the calibration board synchronously as the controlled equipment moves, where the picture contains a calibration point on the calibration board.

Preferably, in the second embodiment, the calibration board 10 is disposed above the controlled equipment, and the industrial lens 20 is fixed on a moving piece of the X-Y motion platform and is oriented to face the calibration board 10, so that camera-based calibration may be realized with reference to the calibration point on the calibration board 10. Alternatively, the calibration board 10 may be disposed below the controlled equipment, or on the left of, on the right of, in front of or in back of the controlled equipment, and the industrial lens 20 is fixed on a moving piece of the X-Y motion platform and is oriented to face the calibration board. The way of installing the calibration board 10 and the industrial lens 20 is not limited in the invention.

The auxiliary calibrating module 30 is configured to: analyze the picture to obtain pixel coordinates of the calibration point in the picture; calculate the actual position coordinates of the controlled equipment from the actual coordinates and the pixel coordinates of the calibration point on the calibration board 10; and adjust a motion control system of the X-Y motion platform according to the actual position coordinates, to control the motion of the X-Y motion platform so as to perform motion compensation for the controlled equipment.

Preferably, in the second embodiment, the camera-based calibration technology may be a traditional camera-based calibration method, where the calibration board on which each calibration point has known coordinates is taken as a calibration object, a correspondence between the calibration point with known coordinates on the calibration object and a point in the picture thereof is established, and internal and external parameters of the camera model may be obtained by a certain algorithm. Calibration objects include 3D calibration objects and planar calibration objects. In this embodiment, the calibration board as shown in FIG. 4 is employed. The calibration board is planar, may be manufactured in a simpler way in comparison with the 3D calibration objects, and is easy to guarantee the calibration accuracy, but two or more pictures are required for calibration.

Preferably, in the second embodiment, based on the picture taken by the industrial lens 20 facing the calibration board 10, the coordinates of the center point 001 of the picture are determined, then pixel coordinates (X1, Y1), (X2, Y2), (X3, Y3) and (X4, Y4) of 4 calibration points 002 around the center point 001 in the picture are calculated, the actual coordinates of the 4 calibration points 002 are respectively denoted by (Xmm1, Ymm1), (Xmm2, Ymm2), (Xmm3, Ymm3) and (Xmm4, Ymm4), and then the actual position coordinates (Xmm, Ymm) of the controlled equipment are calculated.

In order to ensure the accuracy of the obtained actual position coordinates of the controlled equipment, a set of actual position coordinates (Xmm11, Ymm11) are calculated from a group of parameters including the pixel coordinates (X1, Y1) and (X2, Y2) and the actual coordinates (Xmm1, Ymm1) and (Xmm2, Ymm2), and another set of actual position coordinates (Xmm22, Ymm22) are calculated from a group of parameters including the pixel coordinates (X3, Y3) and (X4, Y4) and the actual coordinates (Xmm3, Ymm3) and (Xmm4, Ymm4). For example, first actual position coordinates (Xmm11, Ymm11) of the controlled equipment are calculated by a formulae:

$$\frac{X_{mm11} - X_{mm1}}{X_{mm2} - X_{mm1}} = \frac{X_{mm11} - X1}{X2 - X1};$$

$$\frac{Y_{mm11} - Y_{mm1}}{Y_{mm2} - Y_{mm1}} = \frac{Y_{mm11} - Y1}{Y2 - Y1};$$

second actual position coordinates (Xmm22, Ymm22) of the controlled equipment are calculated by a formulae:

$$\frac{X_{mm22} - X_{mm3}}{X_{mm4} - X_{mm3}} = \frac{X_{mm22} - X3}{X4 - X3};$$

$$\frac{Y_{mm22} - Y_{mm3}}{Y_{mm4} - Y_{mm3}} = \frac{Y_{mm22} - Y3}{Y4 - Y3};$$

then, in combination with the first and second actual position coordinates as obtained, the actual position coordinates (Xmm, Ymm) of the controlled equipment are obtain as:

$$X_{mm} = 0.5 \times (X_{mm11} + X_{mm22});$$

$$Y_{mm} = 0.5 \times (Y_{mm11} + Y_{mm22}).$$

It should be noted that, based on those 4 calibration points 002, the actual position coordinates of the controlled equipment may be alternatively calculated in other parameter combination modes, for example, a set of actual position coordinates may be calculated from a group of parameters including the pixel coordinates (X1, Y1) and (X3, Y3) and the actual coordinates (Xmm1, Ymm1) and (Xmm3, Ymm3), and another set of actual position coordinates may be calculated from a group of parameters including the pixel coordinates (X2, Y2) and (X4, Y4) and the actual coordinates (Xmm2, Ymm2) and (Xmm4, Ymm4). Additionally, the way of calculating the actual position coordinates (Xmm, Ymm) of the controlled equipment in combination with the obtained two sets of actual position coordinates is not limited to the above way of averaging, and other ways of calculating may also be selected as actually desired.

Further, in the second embodiment, the obtained actual position coordinates of the controlled equipment are fed back to the motion control system of the X-Y motion platform as the feedback information, the parameters of the motion control system are configured in conjunction with the target position coordinates initially assigned for the controlled equipment, to control the controlled equipment to further move by a corresponding distance, thereby implementing motion compensation for the controlled equipment. In a specific implementation, the preset target position coordinates (Xmm0, Ymm0) of the controlled equipment are obtained (from the configured parameters of the motion control system, for example), and then a position offset (Dx, Dy) of the controlled equipment is obtained according to the actual position coordinates (Xmm, Ymm) and the target position coordinates (Xmm0, Ymm0), where:

$$D_X = X_{mm} - X_{mm0};$$

$$D_Y = Y_{mm} - Y_{mm0};$$

Subsequently, the position offset is fed back to the motion control system of the X-Y motion platform, and the motion control system of the X-Y motion platform adjusts the control parameter according to the position offset, to control the controlled equipment to move in a direction X by a distance Dx and to move in a direction Y by a distance Dy. Therefore, it is guaranteed that the controlled equipment is moved to the preset target position coordinates, the system error of the conventional X-Y motion platform is reduced, and the control accuracy is improved.

According to the above second embodiment, the actual position coordinates of the moving controlled equipment are attained and taken as the feedback information for adjusting the motion control system of the X-Y motion platform, so as to compensate for the motion of the controlled equipment, thereby improving the control accuracy in comparison with other existing X-Y motion platforms.

Third Embodiment

A high-accuracy X-Y motion platform system is proposed according to a third embodiment. The embodiment of the system shares the same concept as the above method embodiment and the device embodiment, thus reference may be made to the above first and second embodiments for the detailed contents of the third embodiment that are not described herein.

Figure 7:
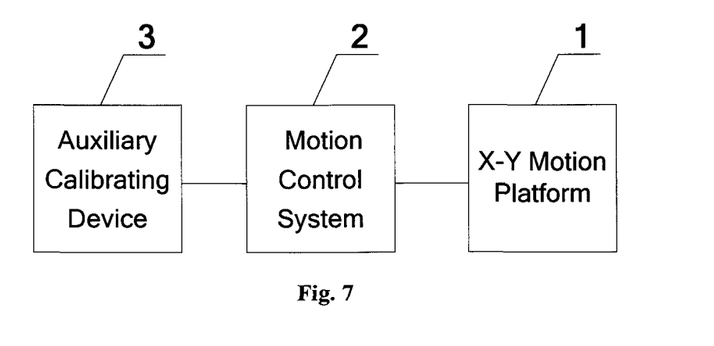
FIG. 7 is a schematic structural view of a high-accuracy X-Y motion platform system according to a third embodiment of the invention.

The high-accuracy X-Y motion platform system according to the third embodiment will be illustrated below in conjunction with FIG. 7. The high-accuracy X-Y motion platform system includes: an X-Y motion platform 1; a motion control system 2 configured to control the X-Y motion platform 1 to move in the direction X and the direction Y; and an auxiliary calibrating device 3, which is disposed on the X-Y motion platform 1 and is in communication with the motion control system 2. Each of these parts will be illustrated in detail below.

A controlled equipment is disposed on the X-Y motion platform 1, and the motion control system 2 is configured to control the X-Y motion platform 1 to move in the direction X and the direction X, so as to move the controlled equipment in the direction X and the direction Y.

The auxiliary calibrating device 3 includes a calibration board, an industrial lens and an auxiliary calibrating module. The industrial lens is configured to move synchronously with the controlled equipment, the calibration board is fixed in position relative to the controlled equipment, coordinates of the calibration point on the calibration board are known, and the calibration board and the industrial lens are in communication with the auxiliary calibrating module.

In this embodiment, the calibration board is disposed above the controlled equipment, and the industrial lens is fixed on a moving piece of the X-Y motion platform and is oriented to face the calibration board, so that camera-based calibration may be realized with reference to the calibration point on the calibration board. Alternatively, the calibration board may be disposed below the controlled equipment, or on the left of, on the right of, in front of or in back of the controlled equipment, and the industrial lens is fixed on a moving piece of the X-Y motion platform and is oriented to face the calibration board. The way of installing the calibration board and the industrial lens is not limited in the invention.

The industrial lens is configured to take a picture of the calibration board synchronously as the controlled equipment on the X-Y motion platform moves, where the picture contains calibration points. The auxiliary calibrating module is configured to: analyze the picture to obtain pixel coordinates of the calibration point in the picture; calculate the actual position coordinates of the controlled equipment from the actual coordinates and the pixel coordinates of the calibration point on the calibration board; and adjust the motion control system 2 according to the actual position coordinates, to control the X-Y motion platform 1 to move correspondingly so as to perform motion compensation for the controlled equipment.

In this embodiment, the camera-based calibration technology may be a traditional camera-based calibration method, where the calibration board on which each calibration point has known coordinates is taken as a calibration object, a correspondence between the calibration point with known coordinates on the calibration object and a point in the picture thereof is established, and internal and external parameters of the camera model may be obtained by a certain algorithm. Calibration objects include 3D calibration objects and planar calibration objects. In this embodiment, the calibration board as shown in FIG. 4 is employed. The calibration board is planar, may be manufactured in a simpler way in comparison with the 3D calibration objects, and is easy to guarantee the calibration accuracy, but two or more pictures are required for calibration.

Preferably, in this embodiment, based on the picture taken by the industrial lens, the coordinates of the center point 001 of the picture are determined, then pixel coordinates (X1, Y1), (X2, Y2), (X3, Y3) and (X4, Y4) of 4 calibration points 002 around the center point 001 in the picture are calculated, and actual coordinates of the 4 calibration points are respectively denoted by (Xmm1, Ymm1), (Xmm2, Ymm2), (Xmm3, Ymm3) and (Xmm4, Ymm4), and then the actual position coordinates (Xmm, Ymm) of the controlled equipment are calculated by the formula below.

In order to ensure the accuracy of the obtained actual position coordinates of the controlled equipment, a set of actual position coordinates (Xmm11, Ymm11) are calculated from a group of parameters including the pixel coordinates (X1, Y1) and (X2, Y2) and the actual coordinates (Xmm1, Ymm1) and (Xmm2, Ymm2), and another set of actual position coordinates (Xmm22, Ymm22) are calculated from a group of parameters including the pixel coordinates (X3, Y3) and (X4, Y4) and the actual coordinates (Xmm3, Ymm3) and (Xmm4, Ymm4). For example, first actual position coordinates (Xmm11, Ymm11) of the controlled equipment are calculated by a formulae:

$$\frac{X_{mm11} - X_{mm1}}{X_{mm2} - X_{mm1}} = \frac{X_{mm11} - X1}{X2 - X1};$$

$$\frac{Y_{mm11} - Y_{mm1}}{Y_{mm2} - Y_{mm1}} = \frac{Y_{mm11} - Y1}{Y2 - Y1};$$

second actual position coordinates (Xmm22, Ymm22) of the controlled equipment are calculated by a formulae:

$$\frac{X_{mm22} - X_{mm3}}{X_{mm4} - X_{mm3}} = \frac{X_{mm22} - X3}{X4 - X3};$$

$$\frac{Y_{mm22} - Y_{mm3}}{Y_{mm4} - Y_{mm3}} = \frac{Y_{mm22} - Y3}{Y4 - Y3};$$

then, in combination with the first and second actual position coordinates as obtained, the actual position coordinates (Xmm, Ymm) of the controlled equipment are obtain as:

$$X_{mm}=0.5\times(X_{mm11}+X_{mm22});$$

$$Y_{mm}=0.5\times(Y_{mm11}+Y_{mm22}).$$

It should be noted that, based on those 4 calibration points 002, the actual position coordinates of the controlled equipment may be alternatively calculated in other parameter combination modes, for example, a set of actual position coordinates may be calculated from a group of parameters including the pixel coordinates (X1, Y1) and (X3, Y3) and the actual coordinates (Xmm1, Ymm1) and (Xmm3, Ymm3), and another set of actual position coordinates may be calculated from a group of parameters including the pixel coordinates (X2, Y2) and (X4, Y4) and the actual coordinates (Xmm2, Ymm2) and (Xmm4, Ymm4).

Additionally, the way of calculating the actual position coordinates (Xmm, Ymm) of the controlled equipment in combination with the obtained two sets of actual position coordinates is not limited to the above way of averaging, and other ways of calculating may also be selected as actually desired.

Further, in this embodiment, the obtained actual position coordinates of the controlled equipment are fed back to the motion control system 2 of the X-Y motion platform 1 as the feedback information, the parameters of the motion control system 1 are configured in conjunction with the target position coordinates initially assigned for the controlled equipment, to control the X-Y motion platform 1 to move further, thereby implementing motion compensation for the controlled equipment. In a specific implementation, the preset target position coordinates (Xmm0, Ymm0) of the controlled equipment are obtained (from the configured parameters of the motion control system 2, for example), and then a position offset (Dx, Dy) of the controlled equipment is obtained according to the actual position coordinates (Xmm, Ymm) and the target position coordinates (Xmm0, Ymm0), where:

$$D_X = X_{mm} - X_{mm0};$$

$$D_Y = Y_{mm} - Y_{mm0};$$

Subsequently, the position offset is fed back to the motion control system 2, which in turn adjusts the control parameter according to the position offset, to control the X-Y motion platform 1 to move in the direction X by a distance Dx and to move in the direction Y by a distance Dy. Therefore, it is guaranteed that the controlled equipment is moved to the preset target position coordinates, the system error of the original X-Y motion platform may be reduced, and the control accuracy may be improved.

In the above third embodiment, the actual position coordinates of the controlled equipment may be attained during movement of the controlled equipment by the auxiliary calibrating device, and the actual position coordinates are fed back as the feedback information for adjusting the motion control system of the X-Y motion platform to compensate for the movement of the controlled equipment. Thus, in comparison with other existing X-Y motion platforms, the control accuracy is improved, and it is advantageous that requirements for assembly (especially in the case of a grating ruler X-Y motion platform based on a marble platform) and the screw rod and the electric motor are reduced.

Some preferred embodiments of the present invention have been described as above, but are not intended to limit the present invention. Any modifications, equivalent substitutions and improvements made without departing from the conception and principle of the present invention should fall in the scope of protection of the present invention.

The invention claimed is:

1. A method for improving system accuracy of an X-Y motion platform, comprising:
   taking a picture of a preset calibration board synchronously as a controlled equipment on an X-Y motion platform moves, and analyzing the picture to obtain pixel coordinates of a calibration point in the picture, wherein the preset calibration board is taken as a reference;
   acquiring actual coordinates of the calibration point on the calibration board, and calculating actual position coordinates of the controlled equipment on the X-Y motion platform from the actual coordinates and the pixel coordinates of the calibration point; and
   adjusting a motion control system of the X-Y motion platform according to the actual position coordinates, to control the motion of the X-Y motion platform to perform motion compensation for the controlled equipment.

2. The method for improving system accuracy of an X-Y motion platform according to claim 1, wherein before taking a picture of a preset calibration board synchronously as a controlled equipment on an X-Y motion platform moves, and analyzing the picture to obtain pixel coordinates of a calibration point in the picture, wherein the preset calibration board is taken as a reference, the method further comprises:
   presetting an auxiliary coordinate system for the X-Y motion platform, wherein the auxiliary coordinate system comprises a calibration board and an industrial lens, the calibration board is fixed in position relative to the controlled equipment on the X-Y motion platform, the coordinates of the calibration point on the calibration board are known, and the industrial lens is movable synchronously with the controlled equipment on the X-Y motion platform.

3. The method for improving system accuracy of an X-Y motion platform according to claim 2, wherein the taking a picture of a preset calibration board synchronously as a controlled equipment on an X-Y motion platform moves and analyzing the picture to obtain pixel coordinates of a calibration point in the picture comprises:
   taking the picture of the calibration board by the industrial lens, and calculating to obtain pixel coordinates of 4 calibration points in the picture around a center point of the picture;
   wherein the acquiring actual coordinates of the calibration point on the calibration board and calculating actual position coordinates of the controlled equipment on the X-Y motion platform from the actual coordinates and the pixel coordinates of the calibration point comprises:
   acquiring actual coordinates of the 4 calibration points on the calibration board, and calculating the actual position coordinates of the controlled equipment on the X-Y motion platform from the actual coordinates and the pixel coordinates of the 4 calibration points.

4. The method for improving system accuracy of an X-Y motion platform according to claim 3, wherein the calculating actual position coordinates of the controlled equipment from the actual coordinates and the pixel coordinates of the calibration point comprises:
   calculating first actual position coordinates (Xmm11, Ymm11) of the controlled equipment by formulae:

$$\frac{X_{mm11} - X_{mm1}}{X_{mm2} - X_{mm1}} = \frac{X_{mm11} - X1}{X2 - X1};$$

$$\frac{Y_{mm11} - Y_{mm1}}{Y_{mm2} - Y_{mm1}} = \frac{Y_{mm11} - Y1}{Y2 - Y1};$$

calculating second actual position coordinates (Xmm22, Ymm22) of the controlled equipment by formulae:

$$\frac{X_{mm22} - X_{mm3}}{X_{mm4} - X_{mm3}} = \frac{X_{mm22} - X3}{X4 - X3}; \text{ and}$$

$$\frac{Y_{mm22} - Y_{mm3}}{Y_{mm4} - Y_{mm3}} = \frac{Y_{mm22} - Y3}{Y4 - Y3};$$

calculating the actual position coordinates of the controlled equipment according to the first actual position coordinates and the second actual position coordinates, wherein (X1, Y1), (X2, Y2), (X3, Y3) and (X4, Y4) represent the pixel coordinates of the 4 calibration points, respectively, and (Xmm1, Ymm1), (Xmm2, Ymm2), (Xmm3, Ymm3) and (Xmm4, Ymm4) represent the actual coordinates of the 4 calibration points, respectively.

5. The method for improving system accuracy of an X-Y motion platform according to claim 4, wherein the calculating the actual position coordinates of the controlled equipment according to the first actual position coordinates and the second actual position coordinates comprises:
obtaining the actual position coordinates (Xmm, Ymm) of the controlled equipment by formulae:

$$X_{mm} = 0.5 \times (X_{mm11} + X_{mm22});$$

$$Y_{mm} = 0.5 \times (Y_{mm11} + Y_{mm22}).$$

6. The method for improving system accuracy of an X-Y motion platform according to claim 1, wherein the adjusting a motion control system of the X-Y motion platform according to the actual position coordinates to control the motion of the X-Y motion platform to perform motion compensation for the controlled equipment comprises:
attaining preset target position coordinates of the controlled equipment;
obtaining a position offset of the controlled equipment according to the actual position coordinates and the target position coordinates, and feeding back the position offset to the motion control system of the X-Y motion platform; and
the motion control system of the X-Y motion platform adjusting control parameters according to the position offset, to control the movement of the X-Y motion platform so as to perform motion compensation for the controlled equipment.

7. The method for improving system accuracy of an X-Y motion platform according to claim 6, wherein the obtaining the position offset of the controlled equipment according to the actual position coordinates and the target position coordinates comprises:
obtaining the position offset (Dx, Dy) of the controlled equipment by formulae:

$$D_X = X_{mm} - X_{mm0};$$

$$D_Y = Y_{mm} - Y_{mm0};$$

wherein (Xmm0, Ymm0) represents the target position coordinates;

wherein the controlling the movement of the X-Y motion platform so as to perform motion compensation for the controlled equipment comprises:
controlling the controlled equipment to move in a direction X by a distance Dx and to move in a direction Y by a distance Dy, so as to perform the motion compensation for the controlled equipment.

8. A device for improving system accuracy of an X-Y motion platform, comprising: a calibration board, an industrial lens and an auxiliary calibrating module, wherein the industrial lens is movable synchronously with a controlled equipment on the X-Y motion platform, the calibration board is fixed in position relative to the controlled equipment, the coordinates of the calibration point on the calibration board are known, the calibration board and the industrial lens are in communication with the auxiliary calibrating module, and the auxiliary calibrating module is in communication with the motion control system of the X-Y motion platform;
the industrial lens is configured to take a picture of the calibration board synchronously as the controlled equipment on the X-Y motion platform moves; and
the auxiliary calibrating module is adapted to: analyze the picture to obtain pixel coordinates of the calibration point in the picture; calculate actual position coordinates of the controlled equipment from the actual coordinates and the pixel coordinates of the calibration point; and adjust a motion control system of the X-Y motion platform according to the actual position coordinates, to control the X-Y motion platform to move correspondingly so as to perform motion compensation for the controlled equipment.

9. The device for improving system accuracy of an X-Y motion platform according to claim 8, wherein the calibration board is disposed above, below, on the left of, on the right of, in front of or in back of the controlled equipment;
the industrial lens is disposed on the X-Y motion platform and is oriented to the calibration board.

10. A high-accuracy X-Y motion platform system, comprising: an X-Y motion platform; a motion control system configured to control the motion of the X-Y motion platform in directions X and Y; and an auxiliary calibrating device in communication with the motion control system;
wherein a controlled equipment is disposed on the X-Y motion platform;
the auxiliary calibrating device comprises: a calibration board, an industrial lens and an auxiliary calibrating module; wherein the industrial lens is movable synchronously with the controlled equipment, the calibration board is fixed in position relative to the controlled equipment, coordinates of each calibration point on the calibration board are known, and the calibration board and the industrial lens are in communication with the auxiliary calibrating module;
the industrial lens is configured to take a picture of the calibration board synchronously as a controlled equipment on the X-Y motion platform moves; and
the auxiliary calibrating module is configured to: analyze the picture to obtain pixel coordinates of the calibration point in the picture; calculate actual position coordinates of the controlled equipment from the actual coordinates and the pixel coordinates of the calibration point; and adjust the motion control system according to the actual position coordinates, to control the motion of the X-Y motion platform so as to perform motion compensation for the controlled equipment.

11. The high-accuracy X-Y motion platform system according to claim 10, wherein the calibration board is disposed above, below, on the left of, on the right of, in front of or in back of the controlled equipment; and
the industrial lens is disposed on the X-Y motion platform and is oriented to the calibration board.

* * * * *